Feb. 16, 1971    L. F. NIEBERGALL ET AL    3,562,895
METHOD OF MAKING FILTER
Original Filed April 6, 1962
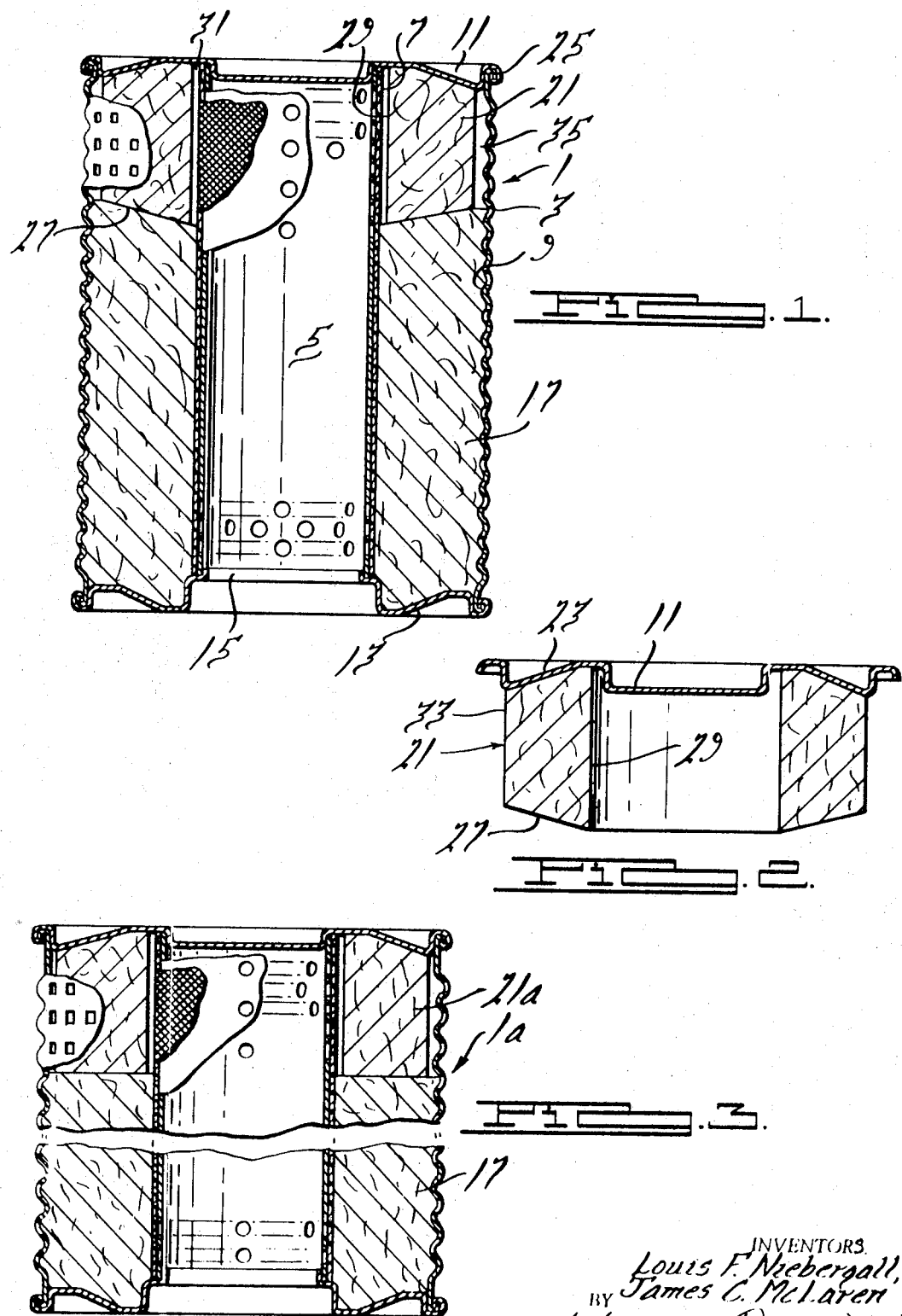
INVENTORS.
Louis F. Niebergall,
BY James C. McLaren
Harness, Dickey & Pierce
ATTORNEYS 3,562,895
METHOD OF MAKING FILTER
Louis F. Niebergall and James C. McLaren, Racine, Wis., assignors, by mesne assignments, to Tenneco Inc., Houston, Tex., a corporation of Delaware
Application Jan. 11, 1967, Ser. No. 613,385, now Patent No. 3,504,800, dated Apr. 7, 1970, which is a continuation of application Ser. No. 185,661, Apr. 6, 1962. Divided and this application May 21, 1969, Ser. No. 826,622
Int. Cl. B23p *17/00*
U.S. Cl. 29—419     2 Claims

ABSTRACT OF THE DISCLOSURE

A high flow molded element formed of uniform diameter resin coated viscose rayon fibers is used in a parallel dual media-dual flow filter to remove particles above a predetermined size. The element is made to a predetermined size, density, porosity, and flow resistance and being essentially rigid it resists unloading. It may be conically shaped to have a substantially uniform rate of flow or internally flocked to provide more uniform porosity. An end cap may be adhered to the element as a subassembly and the inlet and outlet faces are preferably spaced from adjacent portions of the housing to insure flow to the entire areas of these faces.

CROSS REFERENCES TO RELATED APPLICATIONS

This application is a division of copending Serial No. 613,385 filed Jan. 11, 1967, now Pat. No. 3,504,800, which in turn is a continuation of Ser. No. 185,661 filed Apr. 6, 1962, now abandoned.

BRIEF SUMMARY OF THE INVENTION

The invention centers around the method of making a high flow, high porosity, low resistance molded fibrous depth-type filter element preferably formed of uniform diameter, resin coated, viscose rayon fibers which is essentially rigid and resistant to breathing and unloading and therefore has a high efficiency and contaminant retention capacity. Preferably the element is shaped and disposed in the filter so that its effective inlet and outlet areas are substantially the same to obtain a more uniform flow rate through the element than heretofore. The fibers are arranged with a high degree of random orientation and are preferably crimped to minimize the possibility of parallelism. The fiber diameter is preferably less than that of the maximum diameter particle to be removed by the element. An internal flocking technique may be used, if desired, to promote uniform porosity.

The filter element has particular advantages when used as the high flow element in a parallel dual flow automotive type oil filter such as disclosed in U.S. Pat. 2,559,267. In such application it may contact a packed depth type low flow filter media such as waste cotton and it is formed and molded to a predetermined size, shape, density, and porosity that improves the performance of the total filter.

DESCRIPTION OF THE DRAWINGS

FIG. 1 is a cross section through a form of filter cartridge adapted for use in various filters now on the open market;

FIG. 2 is a detailed section of the open or low resistance filter medium showing it rigidly secured to one end cap of the filter cartridge; and FIG. 3 is a view similar to FIG. 1 but shows a different shape for the low resistance filter medium.

DESCRIPTION OF THE PREFERRED EMBODIMENTS

The filter cartridge 1 that is shown in FIG. 1 comprises an outer shell 3 which is perforated so that it is readily pervious to the flow of liquid. Inside of it is a perforated inner tube 5 surrounded by a fabric sleeve 7 that forms a barrier against migration of filter material through the tube 5. The space 9 between the shell 3 and tube 5 comprises a chamber for the filter media and the opposite ends thereof are closed by a top end cap 11 and a bottom end cap 13. The top end cap 11 is preferably arranged so that it closes off the top end of the tube 5 whereas the bottom end cap 13 has an opening 15 in alignment with the bottom of the tube 5. The cartridge 1 is thus of the outside-in type in which oil will flow radially inwardly through the side wall provided by the outer housing 3, through the filter media in chamber 9, and out through the perforated tube 5 down through the opening 15 to the engine bearings, etc. Two filter media 17 and 21 are in chamber 9 and their positions may be reversed from that shown in the drawings if desired.

The filter medium 17 comprises a high resistance and low permeability material such as waste cotton and various other materials well known in the trade. This is packed in tightly between the shell 3 and the tube 5 and is effective to remove relatively fine particles and contaminants from the oil passing through the filter cartridge.

The present invention is directed principally at the filter medium 21. This is a low resistance material (as compared with section 17) which will permit filtration even when the oil is relatively viscous. This medium is preferably composed of viscose rayon fibers, which are preferably crimped, and in which random orientation in the disposition of the fibers is attained as much as possible. The section 21 for one important automotive application is designed to retain a high percentage of particles having a size of 80 microns or larger. For this application we use a body in which all the fibers are uniform in diameter and somewhat smaller in diameter than the particles to be excluded, i.e., fibers about 60 to 70 microns in diameter are suitable. The fibers are preferably 1 to 4 inches in length and packed as uniformly as possible throughout the body to a density of about 0.200 gram per cubic centimeter. When crimped fibers are used, the amplitude and length of the crimps in the molded element should preferably be less than the 80 micron maximum size.

The viscose rayon fibers are preferably coated with a suitable coating and bonding agent to help to make the fibers rigid and resistant to the deleterious effects of heat, water, oil and products of combustion normally found in engine crankcases. Additionally, such coating will enable the mass of fibers to be molded rigidly into the shape illustrated. A solution of phenolformaldehyde resin in alcohol can be used as such an agent to coat the fibers thus serves as a protective coating and also as a bonding agent. The fibers after coating can then be compressed in a hot metal mold in order to achieve a partial cure of the resin and to obtain a molded element having fixed dimensions and forming an essentially rigid but open structure. The final complete cure can then be obtained either with or without fixtures by suitable methods.

One advantage of forming the filter medium 21 as a rigid molded element is that it is more capable of holding particles after entrapment because it can resist the breathing action that is due to fluctuation in pressure across the filter media which in other types of filter medium sometimes causes "unloading." The density of compression is controlled of course, to obtain the proper pressure differential while at the same time excluding particles larger than 80 microns. As an example, 27 grams of either 40 or 50 denier viscose rayon fibers molded into the form of the filter media 21a shown in FIG. 3 gave the desired results when the element 21a was substantially of 3¼" O.D. and 1¹¹⁄₁₆" I.D. and had a 1" minimum height on the outside and a 1¼" height on the inside diameter.

While viscose rayon fibers have proved to be a satisfactory material, other equivalent materials may be used provided they are available in uniform diameter fibers and have the desired coating, packing, and filtering characteristics and resistance to chemical attack.

In addition to the composition and treatment given the materials forming the filter medium 21, the shape of the molded element is also important. It will be noted that the top end of the filter media 21 (as well as 21a) is inclined or tapered, so as to increase the length of the filter element 21 at the inner diameter. This top face 23 is rigidly secured by suitable adhesive or other means to the bottom face of the top end cap 11 so that the two will form a subassembly as shown in FIG. 2, that can be simply dropped into the top of the shell 3 after which the end cap 11 can be crimped at 25 to the top end of the shell 3. The bottom face 27 of the element 21 is also tapered so as to increase the length of the element along the inner diameter whereas the bottom surface of element 21a is at right angles to the axis.

The inner diameter of elements 21 and 21a is larger than the outer diameter of the tube 5 plus the migration barrier 7 so as to provide a flow equalizing chamber 31 around the outside of the migration barrier 7. Similarly, the outer diameter 33 of the element 21 is somewhat smaller than the inner diameter of the shell 3 so as to provide a small chamber 35 surrounding the outside of the filter element 21. The two chambers 31 and 35 accommodate dimensional variations so that the subassembly shown in FIG. 2 can be readily dropped into place in the top of the housing 3 at assembly. Additionally, the chambers 31 and 35 provide for free flow of the oil about both the inner and outer peripheries of the element 21 thus utilizing the full areas of both inner and outer peripheries.

The height of the element 21 along its outer diameter 33 as compared with its height along the inner diameter 29 is preferably in such ratio that the area on the outer periphery is about the same as the area of the element on its inner periphery. Thus, oil will flow through the filter element 21 at a substantially constant velocity, resulting in an increase in efficiency as compared with high flow sections currently used. By making the length of the surface 29 still larger, the outlet velocity can be less than the inlet velocity if that is desired for maximum efficiency. The element 21a of FIG. 3 provides a moderate tendency to equalize inlet and outlet velocities since the bottom surface 27a is at right angles to the axis. The clearances 31 and 35, of course, permit the full areas of the inner and outer peripheries of the elements 21 and 21a to be effective.

It will be noted that in radial cross sections through the face 27 the oil will flow through the filter section 17 as well as through the section 21. Thus, along the length of the face 27 there will be in effect a multi-stage or gradient flow since the resistance will vary along the length of the face 27. By making the face 27 on a sharper taper, the length of this effect which has a tendency to increase the full flow life of the filter, can be incerased. This particular feature is, of course, not found in the design on FIG. 3.

As an additional feature to improve the filtering efficiency of section 21, an internal flocking operation may be used, preferably after the section has been molded. In accordance with one way of providing this feature, a pressure differential is established between the outside and inside surfaces 33 and 29 of the element (as by putting the inside under vacuum and a cone around the outside) and a jet of air is caused to flow laminarly in a radial direction through the element. This air jet is charged with a proper quantity of about 10–20 micron diameter fibers about ¹⁄₁₆" long ("spears") preferably also of viscose rayon. The spears will line up parallel to the path of air flow and will go to the weak spots, or points of highest flow, in the element and deposit there to reduce the oversize. They will wedge themselves in place among the larger fibers or they can be coated with a resin, in the manner described for the larger fibers, so that they will stick and can be molded in place. Such internal flocking can therefore be used to produce uniformity of porosity and resistance through the element and the spears themselves will act as a filter medium. This procedure can also be used to produce a controlled porosity element by deliberately starting with one that is over-porous and uniformly reducing the porosity to the desired degree. The spears can be selected and treated so as to absorb, adsorb, and/or strain out impurities.

Modifications can be made without departing from the spirit and substance of the invention.

What we claim is:

1. The method of making a two-stage depth type fibrous filter comprising a tubular housing filled with a fibrous filter material for fine filtering and a filter element for coarse filtering to remove particles above a predetermined size from a fluid which comprises the steps of selecting a mass of predetermined diameter and uniform diameter synthetic fibers and having a diameter smaller than said predetermined particle size, coating the individual fibers of said mass with a thermosetting resin and drying the fibers after coating, removing a predetermined specific weight of coated fibers from said mass and packing them uniformly into a mold of predetermined size and shape, subjecting said coated fibers in said mold to heat and compression to form them into a body of a predetermined size, shape, permeability, and density and holding them in said mold long enough for said resin to at least partially cure and rigidify the individual fibers and bind them one to another into an essentially rigid but porous filter element of desired shape and size for use in said filter, removing said element from said mold and completing the cure of said resin and adhering an end cap for closing an end of said housing to a face of said element so that a flange portion of the end cap extends around the periphery of the element and tightly packing said fibrous filtering material in said housing and inserting said molded filter element into said housing to press at one end against said packed material and crimping said end cap flange to an end of the housing so that said element presses at one end against said material in said housing.

2. The method of making a two-stage depth type fibrous filter comprising a tubular housing filled with a fibrous filter material for fine filtering and a filter element for coarse filtering to remove particles above a predetermined size from a fluid which comprises the steps of selecting a mass of predetermined diameter and uniform diameter synthetic fibers and having a diameter smaller than said predetermined particle size, coating the individual fibers of said mass with a thermosetting resin and drying the fibers after coating, removing a predetermined specific weight of coated fibers from said mass and packing them uniformly into a mold of predetermined size and shape, subjecting said coated fibers in said mold to heat and compression to form them into a body of a predetermined size, shape, permeability, and density and holding them in said mold long enough for said resin to at least partially cure and rigidify the individual fibers and bind them one to another into an essentially rigid but porous filter element of desired shape and size for use in said filter, removing said element from said mold and completing the cure of said resin, tightly packing said fibrous filtering material in said housing and inserting said molded filter element into said housing to press at one end against said packed material, and crimping the flange of an end cap to the end of the housing adjacent the molded element so that said element presses at one end against said material in said housing.

References Cited
UNITED STATES PATENTS

| | | | |
|---|---|---|---|
| 2,539,768 | 1/1951 | Anderson | 210—496 |
| 2,800,232 | 7/1957 | Marvel | 210—484 |
| 2,888,095 | 5/1959 | Perrini et al. | |
| 2,963,744 | 12/1960 | Cooper | 264—137X |
| 3,043,436 | 7/1962 | Farrey | 210—484 |
| 3,070,233 | 12/1962 | Welch | 210—484 |
| 3,164,506 | 1/1965 | Lake | 29—419X |

CHARLIE T. MOON, Primary Examiner

U.S. Cl. X.R.

29—455, 509; 264—109, 134